United States Patent

Bahnsen

[15] 3,641,337
[45] Feb. 8, 1972

[54] MAGNETIC FLASHGUN MOUNT
[72] Inventor: Gerhard I. W. Bahnsen, Box 1297, South Lake Tahoe, Calif. 95705
[22] Filed: Apr. 2, 1970
[21] Appl. No.: 25,008

[52] U.S. Cl............................240/52.15, 95/11.5, 240/1.3, 248/206, 431/95
[51] Int. Cl...........................................F21l 15/16
[58] Field of Search.....................240/1.3, 2, 3, 2 C, 52.15, 240/52.5, 52.2; 95/11, 11.5; 248/206; 431/93, 94, 95

[56] References Cited

UNITED STATES PATENTS

| | | | |
|---|---|---|---|
| 2,881,685 | 4/1959 | Wagner | 95/11.5 |
| 2,886,664 | 5/1959 | Graubner | 240/52.15 UX |
| 3,439,159 | 4/1969 | McRoskey et al. | 240/52.15 X |
| 3,545,904 | 12/1970 | Brandt | 431/95 |

Primary Examiner—Louis J. Capozi
Attorney—William P. Green

[57] ABSTRACT

A mount for holding a photographic flashgun in a predetermined position relative to a camera, and including two structures to be carried by the flashgun and a support element respectively, with one of the structures taking the form of a magnet and the other being an element attracted to the magnet to hold the flashgun in place, and with the two structures being shaped to interfit in a relation positively holding the flashgun in a certain orientation in which its light is aimed directly toward a subject to be photographed.

11 Claims, 7 Drawing Figures

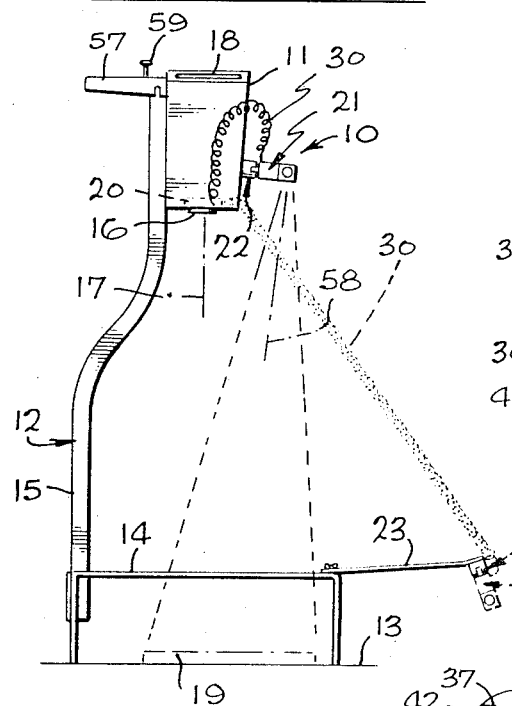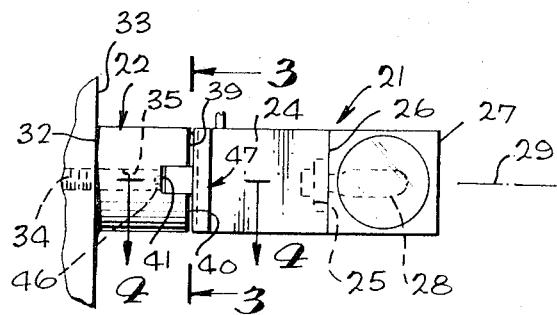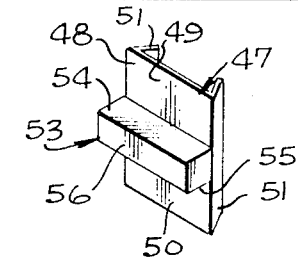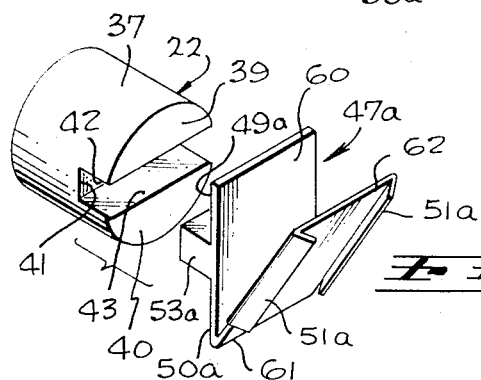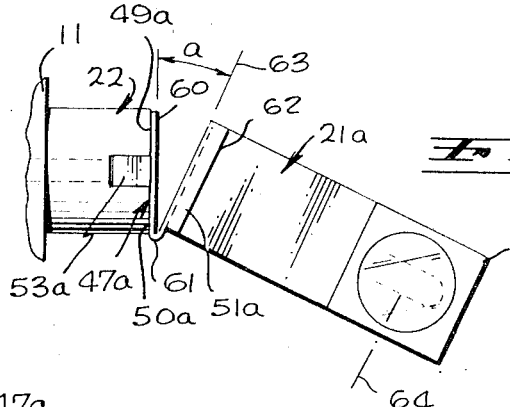

MAGNETIC FLASHGUN MOUNT

CROSS-REFERENCE TO RELATED APPLICATION

Certain features of the apparatus disclosed in the present application have been shown, and certain features have been claimed, in my copending application Ser. No. 25,189, filed of even date herewith on "Collapsible Camera Assembly."

BACKGROUND OF THE INVENTION

This invention relates to improved apparatus for mounting a photographic flashgun in a predetermined orientation relative to a camera, in order to properly illuminate a subject to be photographed.

Conventional mounts for attaching a flashgun to a camera or other structure usually include a bracket forming a guideway within which the flash gun is slidably receivable, and a threaded fastener which upon tightening acts to lock the flashgun in the bracket. This type of mount has the advantage of requiring more manipulation of the connecting parts than would be desired to make and break the mounting connection, and of therefore rendering use of the flashgun rather inconvenient. In some instances, a photographer may hold a flashgun manually rather than connecting it to such a mount, either to avoid the effort involved in mounting the gun, or to provide illumination of the photographic subject from a location other than that of the mount. However, when a flashgun is thus held manually, it is very easy to inadvertently aim the light in a slightly incorrect direction, with the result that the photographic subject is not properly illuminated and the film is not properly exposed.

SUMMARY OF THE INVENTION

The present invention provides a novel type of mount by which a flashgun may be supported in a predetermined position relative to a camera or other structure, in a manner enabling connection of the flashgun to the mounting structure without the necessity for tightening of any fastener element, or otherwise manipulating any special locking part to lock the gun against detachment. As will appear, the gun may be attached to the mounting structure by simply moving the gun into contact with that structure. At the same time, in spite of this ease of connection, the mounting elements are so constructed as to very precisely and reliably locate the flashgun relative to the support to which it is being connected in a manner assuring emission of the light produced by the gun in a precisely proper direction for optimally illuminating the photographic subject.

These results are achieved by a magnetic-type mount, including a magnet structure and a second structure attractable to the magnet, with one of these structures being carried by the flashgun and the other by a supporting element, so that retention of the two structures together magnetically will hold the flashgun in place. To assure proper orientation of the flashgun for emission of light in a desired optimum direction, the two structures are shaped to interfit in a relation positively locating the gun in its desired orientation. For this purpose, one of the structures may have a projection which fits into a recess in the other structure in a positive and accurate location relation. For maximum simplicity and effectiveness, the recess may be formed as a gap between the two poles of the magnet, with the part which is attractable to the magnet having a projection receivable between the poles in locating relation.

BRIEF DESCRIPTION OF THE DRAWING

The above and other features and objects of the invention will be better understood from the following detailed description of the typical embodiments illustrated in the accompanying drawing in which:

FIG. 1 is a side view of a camera and stand assembly utilizing a magnetic flashgun mount embodying the invention;

FIG. 2 is a greatly enlarged fragmentary side view of the flashgun and attracting magnet of FIG. 1;

FIG. 3 is a transverse section taken on line 3—3 of FIG. 2;

FIG. 4 is a section taken along line 4—4 of FIG. 2;

FIG. 5 is a perspective view showing the magnetic metal element which is carried by the flashgun and is attractable to the magnet of the apparatus;

FIG. 6 is a fragmentary side view similar to FIG. 2, but showing a variational form of the invention; and, FIG. 7 is an exploded perspective representation of a magnet and magnetically attractable element of the FIG. 6 form of the invention.

DESCRIPTION OF THE PREFERRED EMBODIMENT

In FIG. 1, I have shown at 10 a camera and stand assembly such as that shown in greater detail and claimed in my above-mentioned copending application Serial No. 15,189. This assembly 10 includes a camera 11 which is supported in fixed position by a stand 12 resting on the ground, floor, or other horizontal surface represented at 13. The stand includes a base portion 14 which extends about and defines a rectangular area to be photographed, and includes also an upstanding support column 15 to the upper end of which the camera 11 is rigidly mounted. The lens 16 of the camera is a fixed-focus type of lens, aimed downwardly along the vertical axis 17 of FIG. 1, and adapted to produce a focused image on the film 18 of a photographic subject 19 resting on or formed by the ground surface.

In order to properly illuminate the photographic subject 19 for optimum exposure of film 18 through lens 16 and an associated preferably fixed-time shutter 20, a flashgun 21 may be mounted to the camera in the position illustrated in full lines in FIG. 1, for toplighting of the photographic subject, or in the broken line position 21' for sidelighting in a manner producing shadows on the subject. The flashgun is retainable in these two positions by two identical magnets 22 and 22', connected respectively to the forward side of the camera and an outwardly projecting mounting arm 23.

With reference now to FIG. 2, the flashgun 21 includes a typically rectangular body 24 having a conventional socket 25 formed at its outer end 26 and adapted to removably receive a standard flashcube 27. This flashcube has four flashbulbs or cells 28 at its four sides, facing in four different directions all perpendicular to the main axis 29 of body 24 and cube 27. Body 24 may contain a battery for firing the four cells 28 of the cube 27 successively, and has actuating means for turning the four cells successively to an active firing position. In FIGS. 1 and 2, the next successive cell to be fired is directed downwardly for illuminating the photographic subject 19, and is fired by the battery in synchronism with the opening of shutter 20 in response to a signal transmitted electrically from shutter 20 to the flashgun through a flexible coiled wire 30. Thus, at each opening of shutter 20 to expose a film at 18, the downwardly facing one of the cells 28 of flashcube 27 is fired to illuminate subject 19 while the shutter is open, following which the advancing mechanism within the body 24 of the flashgun acts to turn cube 27 about axis 29 through 90°, to a position in which the next successive one of the cells 28 is directed downwardly for illuminating the subject.

Magnet 22 may be of the essentially circular configuration illustrated in FIG. 3, having an outer cylindrical surface 31 centered about axis 29. At its rear side, the magnet may have a backface 32 (FIG. 2), disposed transversely of axis 29 and abutting against the forward planar surface 33 of camera 11. The magnet is secured to that forward face of the camera in any appropriate manner, as by a screw 34 extending along axis 29 through an opening 35 in the magnet and connected threadedly into the body of the camera.

At its forward side, the magnet is divided by a diametrical recess or slot 36 into two magnetic poles 37 and 38, having pole faces or surfaces 39 and 40 (FIG. 2) which lie in a common plane disposed transversely of axis 29. These two faces 39 and 40 have the approximately semicircular configuration illustrated in FIG. 3.

Recess 36 may be defined as having a preferably planar inner wall 41, lying in a plane disposed transversely of axis 29, and having two parallel planar sidewalls 42 and 43 lying in planes perpendicular to inner wall 41, and parallel to and spaced equal distances in opposite directions from axis 29. All three of the walls 41, 42, and 43 extend entirely across the width of the magnet, to give the recess 36 a uniform cross section (the section seen in FIG. 2) along its entire length. The recess is preferably substantially longer in the direction indicated at 44 than in the direction 45 of FIG. 3, and for best results has a dimension at least twice as great in the direction 44 as in the direction 45. The screw 34 for retaining the magnet 22 on the camera may have its head 46 received within a countersink recess formed at the outer end of passage 35 within the magnet, so that the screw is located entirely inwardly of the plane of wall surface 41 (leftwardly in FIG. 2), avoid extension of any portion of the screw dimensioned into that recess.

For retention by and interfitting engagement with magnet 22, the body 24 of the flashgun carries an element 47 (FIGS. 4 and 5) which is formed of a rigid ferrous metal, such as steel, or any other suitable material which is magnetically attracted by magnet 22. Element 47 may be considered as taking the form of a plate 48 having two planar faces 49 and 50 lying in a common plane disposed transversely of axis 29 and dimensionsed to engage the two pole faces 39 and 40 respectively of the magnet. The opposite edges of this plate 48 may be turned inwardly at 51 to tightly engage and grip a dovetail-shaped projection 52 (FIG. 4) formed on the inner end of body 24 of the flashgun. This engagement of inturned flanges 51 with the body is such as to permanently retain element 47 in the illustrated position of attachment to the flashgun body.

At its left side as viewed in FIGS. 2, 4 and 5, element 47 has a projection 53 which is shaped to fit closely within and be accurately located by the previously discussed interpole recess 36 of the magnet. More particularly, projection 53 may have two opposite side surfaces 54 and 55 which are parallel to one another and to axis 29, and spaced equal distances in opposite directions from that axis, and are spaced apart approximately the same distance 45 as are walls 42 and 43 of recess 36, (see FIG. 3), so that the two projection surfaces 54 and 55 are engageable with surfaces 42 and 43 to locate body 24 accurately relative to magnet 22, and positively prevent turning movement of the flashgun about axis 29 relative to the magnet. At its inner end, projection 53 has a third surface 56, which is disposed transversely of axis 29, and is received closely adjacent the inner wall surface 41 of recess 36. The length of projection 56 in the direction indicated in 44 in FIG. 3 is approximately the same as the length of recess 36, and like the recess, the projection may have a uniform cross section along that entire length.

The second magnet 22', for mounting the flashgun in the position 21' of FIG. 1, may be constructed exactly the same as magnet 22, and be retained to arm 23 by a screw of the same type illustrated at 34 in FIG. 2.

In using the apparatus thus far described, a photographer moves the entire assembly of FIG. 1 by means of a handle 57 to a proper photographic position over the subject 19. If a toplighted picture is desired, he connects flashgun 21 to magnet 22 on the forward side of the camera, by merely moving the flashgun assembly to a position in which projection 53 of element 57 extends into recess 36 of the magnet, and faces 49 and 50 of element 47 are in engagement with and magnetically retained by pole faces 39 and 40 of the magnet. The magnetic force is great enough to in this condition very tightly hold the flashgun in the illustrated position. The reception of projection 53 within recess 36 acts in the manner previously discussed to accurately locate the flashgun relative to magnet 22 and the camera, so that the next-to-be-fired cell of flashcube 27 is directed downwardly along the axis 58 of FIG. 1, to illuminate the subject 19 to exactly the proper extent. When the camera is operated, as by pushbutton 59 of FIG. 1, to open shutter 20 and expose the film, flashgun 24 simultaneously fires the downwardly directed cell of flash cube 27, following which the flashgun automatically turns the cube through 90° to the next successive firing position. If it is desired to illuminate a subject from the location 21' of FIG. 1, the flashgun 21 is moved to the broken line position of retention by the second magnet 22', in which the interfitting relationship between the flashgun and magnet 22' holds the flashgun in a precisely oriented relation relative to the camera, stand and subject, to aim the light of the next-to-be-fired flash cube leftwardly in FIG. 1 and directly toward subject 19. Thus, in either position of the flashgun, the magnet 22 or 22' holds the gun in exactly the proper position for optimum illumination of the subject.

FIGS. 6 and 7 show fragmentarily an arrangement which may be considered identical to that of FIGS. 1–5 except for substitution of a changed element 47a in lieu of the element 47 of FIG. 5. As seen best in FIG. 7, element 47a may have a first portion 60 for engagement with the magnet, with a projection 53a corresponding to that shown at 53 in FIG. 5, and with two planar faces 49a and 50a corresponding to faces 49 and 50 of FIG. 5. Thus, portion 60 will be retained by and interfit with the magnet 22 in exactly the manner discussed for element 47 of FIGS. 1–5. However, the portion 60 of element 47a does not have the inturned flanges 51 of FIG. 5 at its opposite sides, but instead, at one of its edges 61, is connected to or integral with a second portion 62 of element 47, which lies in a plane 63 (FIG. 6) disposed at an angle $a$ to the plane of portion 60. This portion 62 of element 47a has inturned flanges 51a corresponding to flanges 51 of FIG. 5, and clamped against the portion 42 of 52 24 for permanent attachment thereto. The material of element 47a is rigid enough to permanently retain the two portions 60 and 62 of that element in the relatively angular position illustrated in FIGS. 6 and 7, so that the element 47a has the effect of aiming the light from the active one of the cells of flashgun 27a along an axis 64 which is disposed at a greater angle to the vertical than is axis 58 of FIG. 1. This mounting arrangement of FIGS. 6 and 7 is utilized in instances in which the camera 11 is to be positioned closer to subject 19, in which case the light from the flashcube 27a must converge more rapidly toward the axis of the camera for proper illumination of the closer subject.

While certain specific embodiments of the present invention have been disclosed as typical, the invention is of course not limited to these particular forms, but rather is applicable broadly to all such variations as fall within the scope of the appended claims.

I claim:

1. The combination comprising a photographic flashgun structure for emitting light in a predetermined direction onto a photographic subject, and a mounting structure for detachably holding said flashgun structure, one of said structures including a magnet and the other structure having a portion attracted to said magnet to hold the flashgun structure on the mounting structure, said structures being shaped to interfit with one another in a locating relation positively retaining said flashgun structure against turning movement relative to said mounting structure from a position of proper orientation for directing light in said predetermined direction.

2. The combination as recited in claim 1, in which one of said structures has a projection which is receivable within a mating recess in the other structure in said locating relation and which retains said flashgun structure against said turning movement.

3. The combination as recited in claim 1, in which said magnet has two poles and a recess therebetween, and said other structure has projection extending into said recess in said interfitting location relation.

4. The combination as recited in claim 1, in which said magnet has two poles defining an elongated recess therebetween, said other structure having two faces adapted to be attracted to and engage said poles respectively and having a projection located between said faces and projecting therebeyond and which is dimensioned to fit within said recess in said locating relation and is elongated in the same direction as said recess.

5. The combination as recited in claim 1, including a camera for taking a picture of a photographic subject, and means securing said mounting structure to said camera in a relation to direct said light of the flashgun structure onto the same subject being photographed by the camera.

6. The combination as recited in claim 1, in which said mounting structure includes said magnet.

7. The combination comprising a flashgun including a body structure and a socket thereon which removably carries a flashcube having four flash cells facing in different directions, said socket being constructed to turn said cube about a predetermined axis and thereby turn said cells successively to a predetermined firing position for emitting light in a predetermined direction onto a photographic subject, and a mounting structure for detachably holding said flashgun body structure, one of said structures including a magnet and the other structure having a portion attracted to said magnet to hold the flashgun body structure on the mounting structure, said structures being shaped to interfit with one another in a locating relation positively retaining said flashgun body structure against turning movement about said axis relative to said mounting structure from a position of proper orientation for directing light in said predetermined direction.

8. The combination as recited in claim 7, in which one of said structures has a projection which is receivable within a mating recess in the other structure in said locating relation and which retains said flashgun body structure against said turning movement.

9. The combination as recited in claim 7, in which said magnet has two poles and a recess therebetween, and said other structure has a projection extending into said recess in said interfitting locating relation.

10. The combination as recited in claim 7, in which said mounting structure includes said magnet, said magnet having two poles defining an elongated recess therebetween; said flashgun body structure having two faces lying essentially in a common plane disposed transversely of said axis and adapted to be attracted to and engage said poles respectively, and said body structure having a projection located between said faces and projecting beyond said plane and which is elongated in the same direction as said recess and dimensioned to fit closely therein in locating relation.

11. The combination as recited in claim 10, including a camera for taking a picture of a photographic subject, and means securing said mounting structure to said camera in a relation to direct said light of the flashgun onto the same subject being photographed by the camera.

* * * * *